US012074696B2

United States Patent
Sun et al.

(10) Patent No.: US 12,074,696 B2
(45) Date of Patent: Aug. 27, 2024

(54) METHOD AND APPARATUS FOR PROCESSING SERVICE BITSTREAM

(71) Applicant: HUAWEI TECHNOLOGIES CO., LTD., Shenzhen (CN)

(72) Inventors: Desheng Sun, Shenzhen (CN); Qiwen Zhong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 609 days.

(21) Appl. No.: 17/165,835

(22) Filed: Feb. 2, 2021

(65) Prior Publication Data

US 2021/0159999 A1    May 27, 2021

Related U.S. Application Data

(63) Continuation of application No. PCT/CN2019/120141, filed on Nov. 22, 2019.

(30) Foreign Application Priority Data

Nov. 26, 2018   (CN) .......................... 201811419063.5

(51) Int. Cl.
   *H04L 1/00*   (2006.01)
(52) U.S. Cl.
   CPC .......... *H04L 1/0011* (2013.01); *H04L 1/0057* (2013.01)
(58) Field of Classification Search
   CPC . H04L 1/0011; H04L 1/0057; H04L 25/4908; H04L 1/0013; H04L 1/0067
   See application file for complete search history.

(56) References Cited

U.S. PATENT DOCUMENTS

| | | | |
|---|---|---|---|
| 2006/0209684 A1* | 9/2006 | Bei | H04L 47/30 370/468 |
| 2018/0098076 A1* | 4/2018 | Su | H04J 3/1658 |
| 2018/0159785 A1* | 6/2018 | Wu | H04J 3/1658 |
| 2018/0167160 A1 | 6/2018 | Gareau et al. | |
| 2020/0220650 A1* | 7/2020 | Cheng | H04L 1/0023 |

FOREIGN PATENT DOCUMENTS

| | | |
|---|---|---|
| CN | 101330350 A | 12/2008 |
| CN | 106301678 A | 1/2017 |
| CN | 106411454 A | 2/2017 |

(Continued)

OTHER PUBLICATIONS

Search Report issued in CN 2018114190635, dated Feb. 5, 2021, 2 pages.

(Continued)

*Primary Examiner* — Zhensheng Zhang

(57) ABSTRACT

An embodiment provides a constant bit rate (CBR) service bitstream processing method. In that embodiment, the CBR service bitstream is received; a code block stream is obtained based on the service bitstream. An encoding type of the code block stream is M bit/N bit encoding, M is a positive integer, N is an integer not less than M, the code block stream includes a first-type code block and a second-type code block, the first-type code block includes M service bits, the second-type code block includes L service bits, and L is an integer less than M and not less than 0. The ode block stream is sent. A quantity of service bits carried in the second-type code block may be flexibly adjusted.

20 Claims, 8 Drawing Sheets

| | | | | | | | | | | |
|---|---|---|---|---|---|---|---|---|---|---|
| Row 1 | 0 1 | D0 | D1 | D2 | D3 | D4 | D5 | D6 | D7 | |
| Row 2 | 1 0 | 0x1E | C0 | C1 | C2 | C3 | C4 | C5 | C6 | C7 |
| Row 3 | 1 0 | 0x78 | D1 | D2 | D3 | D4 | D5 | D6 | D7 | |
| Row 4 | 1 0 | 0x4B | D1 | D2 | D3 | O0 | C4 | C5 | C6 | C7 |
| Row 5 | 1 0 | 0x87 | 0 0 0 0 0 0 0 | C1 | C2 | C3 | C4 | C5 | C6 | C7 |
| Row 6 | 1 0 | 0x99 | D0 | 0 0 0 0 0 0 | C2 | C3 | C4 | C5 | C6 | C7 |
| Row 7 | 1 0 | 0xAA | D0 | D1 | 0 0 0 0 0 | C3 | C4 | C5 | C6 | C7 |
| Row 8 | 1 0 | 0xB4 | D0 | D1 | D2 | 0 0 0 0 | C4 | C5 | C6 | C7 |
| Row 9 | 1 0 | 0xCC | D0 | D1 | D2 | D3 | 0 0 0 | C5 | C6 | C7 |
| Row 10 | 1 0 | 0xD2 | D0 | D1 | D2 | D3 | D4 | 0 0 | C6 | C7 |
| Row 11 | 1 0 | 0xE1 | D0 | D1 | D2 | D3 | D4 | D5 | 0 | C7 |
| Row 12 | 1 0 | 0xFF | D0 | D1 | D2 | D3 | D4 | D5 | D6 | |

(56) References Cited

FOREIGN PATENT DOCUMENTS

| CN | 107438029 A | 12/2017 | |
|---|---|---|---|
| CN | 108092739 A | 5/2018 | |
| EP | 2154833 A1 | 2/2010 | |
| EP | 3319254 A1 | 5/2018 | |
| JP | 2001308712 A | 11/2001 | |
| JP | 2010509811 A | 3/2010 | |
| JP | 2018523409 A | 8/2018 | |
| WO | WO-2016197894 A1 * | 12/2016 | .......... H04J 14/0246 |
| WO | WO-2017016379 A1 * | 2/2017 | ................ H04J 3/07 |
| WO | 2018031712 A1 | 2/2018 | |

OTHER PUBLICATIONS

Office Action issued in CN 201811419063.5, dated Mar. 31, 2021, 10 pages.
Japanese Office Action dated Apr. 12, 2022 for Application No. 2021-507018 with English translation, 12 pages.
IA OIF-FLEXE-01.0, Flex Ethernet Implementation Agreement, Mar. 2016, 31 pages.
IA OIF-FLEXE-02.0, Flex Ethernet 2.0, Implementation Agreement, Jun. 22, 2018, 51 pages.
Rixin Li et al, X-Ethernet: Enabling integrated Fronthaul/Backhaul Architecture in 5G Networks, 2017 IEEE Conference on Standards for Communications and Networking (CSCN), dated Sep. 18, 2017, 6 pages.
European Patent Office extended European Search Report for Application No. 19890197.7 dated Sep. 22, 2021, 9 pages.

* cited by examiner

|  |  |  | 0 0 0 0 0 0 0 0 0 0 1 1 1 1 1 1 1 1 1 1 2 2 2 2 2 2 2 2 2 2 3 3 3 3 3 3 3 3 3 3 4 4 4 4 4 4 4 4 4 4 5 5 5 5 5 5 5 5 5 5 6 6 6 6 6 6 6 |
|  |  |  | 0 1 2 3 4 5 6 7 8 9 0 1 2 3 4 5 6 7 8 9 0 1 2 3 4 5 6 7 8 9 0 1 2 3 4 5 6 7 8 9 0 1 2 3 4 5 6 7 8 9 0 1 2 3 4 5 6 7 8 9 0 1 2 3 4 5 |
|---|---|---|---|
| Row 1 | 0 | 1 | D0 ............... D1 ............... D2 ............... D3 ............... D4 ............... D5 ............... D6 ............... D7 |
| Row 2 | 1 | 0 | 0x1E | C0 ............ C1 ............ C2 ............ C3 ............ C4 ............ C5 ............ C6 ............ C7 |
| Row 3 | 1 | 0 | 0x78 | D1 ............ D2 ............ D3 ............ D4 ............ D5 ............ D6 ............ D7 |
| Row 4 | 1 | 0 | 0x4B | D1 ............ C1 ............ C2 ............ 00 ............ C4 ............ C5 ............ C6 ............ C7 |
| Row 5 | 1 | 0 | 0x87 | 0 0 0 0 0 0 D0 ............ C1 ............ C2 ............ C3 ............ C4 ............ C5 ............ C6 ............ C7 |
| Row 6 | 1 | 0 | 0x99 | D0 ............ 0 0 0 0 0 0 D1 ............ 0 0 0 0 0 D2 ............ C3 ............ C4 ............ C5 ............ C6 ............ C7 |
| Row 7 | 1 | 0 | 0xAA | D0 ............ D1 ............ 0 0 0 0 0 D2 ............ 0 0 0 0 D3 ............ C4 ............ C5 ............ C6 ............ C7 |
| Row 8 | 1 | 0 | 0xB4 | D0 ............ D1 ............ D2 ............ 0 0 0 0 D3 ............ 0 0 0 C4 ............ C5 ............ C6 ............ C7 |
| Row 9 | 1 | 0 | 0xCC | D0 ............ D1 ............ D2 ............ D3 ............ 0 0 0 C4 ............ 0 0 C5 ............ C6 ............ C7 |
| Row 10 | 1 | 0 | 0xD2 | D0 ............ D1 ............ D2 ............ D3 ............ D4 ............ 0 0 C5 ............ 0 C6 ............ C7 |
| Row 11 | 1 | 0 | 0xE1 | D0 ............ D1 ............ D2 ............ D3 ............ D4 ............ D5 ............ 0 C6 ............ C7 |
| Row 12 | 1 | 0 | 0xFF | D0 ............ D1 ............ D2 ............ D3 ............ D4 ............ D5 ............ D6 |

FIG. 1

| | 0 0 0 0 0 0 0 0 0 0 1 1 1 1 1 1 1 1 1 1 2 2 2 2 2 2 2 2 2 2 3 3 3 3 3 3 3 3 3 3 4 4 4 4 4 4 4 4 4 4 5 5 5 5 5 5 5 5 5 5 6 6 6 6 6 6<br>0 1 2 3 4 5 6 7 8 9 0 1 2 3 4 5 6 7 8 9 0 1 2 3 4 5 6 7 8 9 0 1 2 3 4 5 6 7 8 9 0 1 2 3 4 5 6 7 8 9 0 1 2 3 4 5 6 7 8 9 0 1 2 3 4 5 |
|---|---|
| S code block | 1 0 | 0x78 | D1 | D2 | D3 | D4 | D5 | D6 | D7 |
| First extension | 1 0 | 0x78 | Indication bits | Available service bits |
| T7 code block | 1 0 | 0xFF | D0 | D1 | D2 | D3 | D4 | D5 | D6 |
| Second extension | 1 0 | 0xFF | Indication bits | Available service bits |
| O code block | 1 0 | 0x4B | D1 | D2 | D3 | O0 | C4 | C5 | C6 | C7 |
| Third extension | 1 0 | 0x4B | Indication bits | Available service bits |
| Fourth extension | 1 0 | 0x4B | Indication bits | Available service bits |
| Reserved code blocks | 1 0 | 0x00 | D0 | D1 | D2 | O0 | C4 | C5 | C6 | C7 |
| | | | | | | D3 | D4 | D5 | D6 |
| Fifth extension | 1 0 | 0x00 | Indication bits | Available service bits |

FIG. 4

METHOD AND APPARATUS FOR PROCESSING SERVICE BITSTREAM

CROSS-REFERENCE TO RELATED APPLICATIONS

This application is a continuation of International Application No. PCT/CN2019/120141, filed on Nov. 22, 2019, which claims priority to Chinese Patent Application No. 201811419063.5, filed on Nov. 26, 2018. The aforementioned applications are hereby incorporated by reference in their entireties.

TECHNICAL FIELD

Various embodiments relate to the communications field, and in particular, to a method and apparatus for processing a service bitstream.

BACKGROUND

An Ethernet is highly popular with network vendors, owing to a simple and best-effort transmission mode and a standardized interworking mechanism of the Ethernet. At present, an Ethernet-based transmission technology has been widely applied in a telecommunications network.

Due to special requirements of government and enterprise customers, financial customers, and the like for networks, a CBR service will exist in the long term. After an Ethernet is used for a telecommunications network, how a CBR service is carried becomes an issue to be urgently resolved.

SUMMARY

Embodiments of this application provide a method and apparatus for processing a service bitstream, to resolve an issue about carrying a CBR service.

According to a first aspect, a method for processing a constant bit rate CBR service bitstream is provided. The method includes: receiving the CBR service bitstream; obtaining a code block stream based on the service bitstream, where an encoding type of the code block stream is M bit/N bit encoding, M is a positive integer, N is an integer not less than M, the code block stream includes a first-type code block and a second-type code block, the first-type code block includes M service bits, the second-type code block includes L service bits, and L is an integer less than M and not less than 0; and sending the code block stream. A CBR service can flexibly be carried by using the second-type code block, and a code block structure of the code block stream can be determined based on a bit granularity, so that a rate deviation between a user service rate and a server layer channel rate can be well adapted. A rate for receiving the CBR service bitstream is the user service rate, and a rate for sending the code block stream is the server layer channel rate.

In one implementation, the second-type code block includes an indicator bit, and the indicator bit is used to indicate a quantity of service bits in the second-type code block. A receive end can conveniently determine the quantity of service bits in the second-type code block by using the indicator bit.

In one implementation, the L service bits are consecutively distributed in the second-type code block, the L service bits are located at an $I^{th}$ bit location to an $(I+L-1)^{th}$ bit location in the second-type code block, and the $I^{th}$ bit location is a preset bit location or the $(I+L-1)^{th}$ bit location is a preset bit location. The receive end can conveniently restore the service bit from the second-type code block by specifying the service bit location.

In one implementation, the code block stream is a periodic code block stream, and before the obtaining a code block stream based on the service bitstream, the method further includes: determining a quantity of service bits in a second-type code block in one code block period based on a rate for obtaining the service bitstream and a rate for sending the code block stream; or determining a quantity of service bits in a second-type code block in one code block period based on an interface nominal rate for obtaining the service bitstream and an interface nominal rate for sending the code block stream; or determining a quantity of service bits in a second-type code block in one code block period based on an interface nominal margin rate for obtaining the service bitstream and an interface nominal margin rate for sending the code block stream. The quantity of service bits in the second-type code block is determined based on the user service rate and the server layer channel rate, so that the rate deviation between the user service rate and the server layer channel rate can be accurately adapted. Depending on a different requirement or a different tolerance for a service, the rate deviation may be determined by using the nominal rates, the rate deviation may be determined by using the upper and lower tolerance rates, or the rate deviation may be determined by monitoring the actual rates.

In one implementation, the code block stream is a periodic code block stream, and quantities of first-type code blocks included in different code block periods are the same.

In one implementation, the M bit/N bit encoding is 64B/66B encoding; the second code block includes a type bit, and the type bit is one of 0x00, 0x78, 0x4B, 0x87, 0x99, 0xAA, 0xB4, 0xCC, 0xD2, 0xE1, and 0xFF; the second-type code block further includes an indicator bit, and the indicator bit is used to indicate a quantity of service bits in the second-type code block; and the type bit and the indicator bit are different bits. The type bit and the indicator bit are different bits, and therefore an existing control code block can be well extended to obtain a required second-type code block.

In one implementation, the service bitstream is a constant bit rate service bitstream, the M bit/N bit encoding is 64B/66B encoding, the first-type code block is a data D code block, and the second-type code block is one of an O code block, an S code block, a T code block, and an IDLE code block.

In one implementation, the code block stream is a periodic code block stream, and a second-type code block in one code block period includes one T code block and one S code block that are consecutive; or a second-type code block in one code block period includes one T code block, an IDLE code block whose quantity is a positive integer, and one S code block that are consecutive. A requirement of a standard can be well satisfied by using one T code block and one S code block that are consecutive or one T code block, an IDLE code block whose quantity is a positive integer, and one S code block that are consecutive. This code block format is fully compatible with a format of an Ethernet packet specified in IEEE 802.3.

According to a second aspect, a method for processing a constant bit rate CBR service bitstream is provided. The method includes: receiving the code block stream, where an encoding type of the code block stream is M bit/N bit encoding, M is a positive integer, N is an integer not less than M, the code block stream includes a first-type code block and a second-type code block, the first-type code block includes M service bits, the second-type code block includes L service bits, and L is an integer less than M and not less than 0; obtaining the CBR service bitstream based on the code block stream; and sending the CBR service bitstream. A user bit is restored from the code block stream on a server layer channel, where the code block stream on the server layer channel includes the second-type code block. A CBR service can flexibly be carried by using the second-type code block, and the CBR service bitstream can be restored based on a bit granularity, so that a rate deviation between a user service rate and a server layer channel rate can be well adapted. A rate for receiving the code block stream is the server layer channel rate, and a rate for sending the CBR service bitstream is the user service rate.

In one implementation, the second-type code block includes an indicator bit, and the indicator bit is used to indicate a quantity of service bits in the second-type code block. The quantity of service bits in the second-type code block can conveniently be determined by using the indicator bit.

In one implementation, the L service bits are consecutively distributed in the second-type code block, the L service bits are located at an $I^{th}$ bit location to an $(I+L-1)^{th}$ bit location in the second-type code block, and the $I^{th}$ bit location is a preset bit location or the $(I+L-1)^{th}$ bit location is a preset bit location. The service bit can conveniently be restored from the second-type code block by specifying the service bit location.

In one implementation, the code block stream is a periodic code block stream, and quantities of first-type code blocks included in different code block periods are the same.

In one implementation, the M bit/N bit encoding is 64B/66B encoding; the second code block includes a type bit, and the type bit is one of 0x00, 0x78, 0x4B, 0x87, 0x99, 0xAA, 0xB4, 0xCC, 0xD2, 0xE1, and 0xFF; the second-type code block further includes an indicator bit, and the indicator bit is used to indicate a quantity of service bits in the second-type code block; and the type bit and the indicator bit are different bits. The type bit and the indicator bit are different bits, and therefore an existing control code block can be well extended to obtain a required second-type code block.

In one implementation, the M bit/N bit encoding is 64B/66B encoding, the first-type code block is a data D code block, and the second-type code block is one of an O code block, an S code block, a T code block, and an IDLE code block.

In one implementation, the code block stream is a periodic code block stream, and a second-type code block in one code block period includes one T code block and one S code block that are consecutive; or a second-type code block in one code block period includes one T code block, an IDLE code block whose quantity is a positive integer, and one S code block that are consecutive. A requirement of a standard can be well satisfied by using one T code block and one S code block that are consecutive or one T code block, an IDLE code block whose quantity is a positive integer, and one S code block that are consecutive. This code block format is fully compatible with a format of an Ethernet packet specified in IEEE 802.3.

In one implementation, before the sending the service bitstream, the method further includes:

storing the service bitstream in a buffer, and determining a sending rate of the service bitstream based on a threshold of the buffer. The sending rate of the CBR service bitstream can accurately be restored by using the buffer, and a transmit end of the code block stream does not need to explicitly notify the sending rate of the CBR service bitstream.

According to a third aspect, an apparatus for processing a constant bit rate CBR service bitstream is provided. The communications apparatus has a function of implementing the first aspect. The function may be implemented by using hardware, or may be implemented by hardware executing corresponding software. The hardware or software includes one or more units or modules corresponding to the foregoing function.

In one design, the communications apparatus includes a processor, a memory, a bus, and a communications interface. The memory stores a computer executable instruction, and the processor is connected to the memory through the bus. When the communications apparatus runs, the processor executes the computer executable instruction stored in the memory, so that the communications apparatus performs the method for processing a CBR service bitstream according to any one of the first aspect or the implementations of the first aspect.

In another possible design, the communications apparatus may alternatively be a chip. The chip includes a processing unit, and optionally further includes a storage unit. The chip may be configured to perform the method for processing a CBR service bitstream according to any one of the first aspect or the implementations of the first aspect.

According to a fourth aspect, an apparatus for processing a constant bit rate CBR service bitstream is provided. The communications apparatus has a function of implementing the second aspect. The function may be implemented by using hardware, or may be implemented by hardware executing corresponding software. The hardware or software includes one or more units or modules corresponding to the foregoing function.

In one design, the communications apparatus includes a processor, a memory, a bus, and a communications interface. The memory stores a computer executable instruction, and the processor is connected to the memory through the bus. When the communications apparatus runs, the processor executes the computer executable instruction stored in the memory, so that the communications apparatus performs the method for processing a CBR service bitstream according to any one of the second aspect or the implementations of the second aspect.

In another possible design, the communications apparatus may alternatively be a chip. The chip includes a processing unit, and optionally further includes a storage unit. The chip may be configured to perform the method for processing a CBR service bitstream according to any one of the second aspect or the implementations of the second aspect.

According to a fifth aspect, an embodiment of the present invention provides a computer storage medium. The computer storage medium stores a computer software instruction used by the foregoing terminal, and includes a program designed for executing the first aspect, or any implementation of the first aspect.

According to a sixth aspect, an embodiment of this application provides a computer storage medium. The computer storage medium stores a computer software instruction used by the foregoing terminal, and includes a program designed for executing the second aspect, or any implementation of the second aspect.

According to a seventh aspect, an embodiment of this application provides a computer program product. The computer program product includes a computer software instruction, and the computer software instruction may be loaded by a processor to implement a procedure in the method according to any one of the first aspect or the implementations of the first aspect.

According to an eighth aspect, an embodiment of this application provides a computer program product. The computer program product includes a computer software instruction, and the computer software instruction may be loaded by a processor to implement a procedure in the method according to any one of the second aspect or the implementations of the second aspect.

BRIEF DESCRIPTION OF DRAWINGS

FIG. 1 is a schematic diagram of a code type of 64B/66B encoding according to an embodiment of this application;

FIG. 4 is a schematic diagram of extending a control block according to an embodiment of this application;

DESCRIPTION OF EMBODIMENTS

Figure 2:
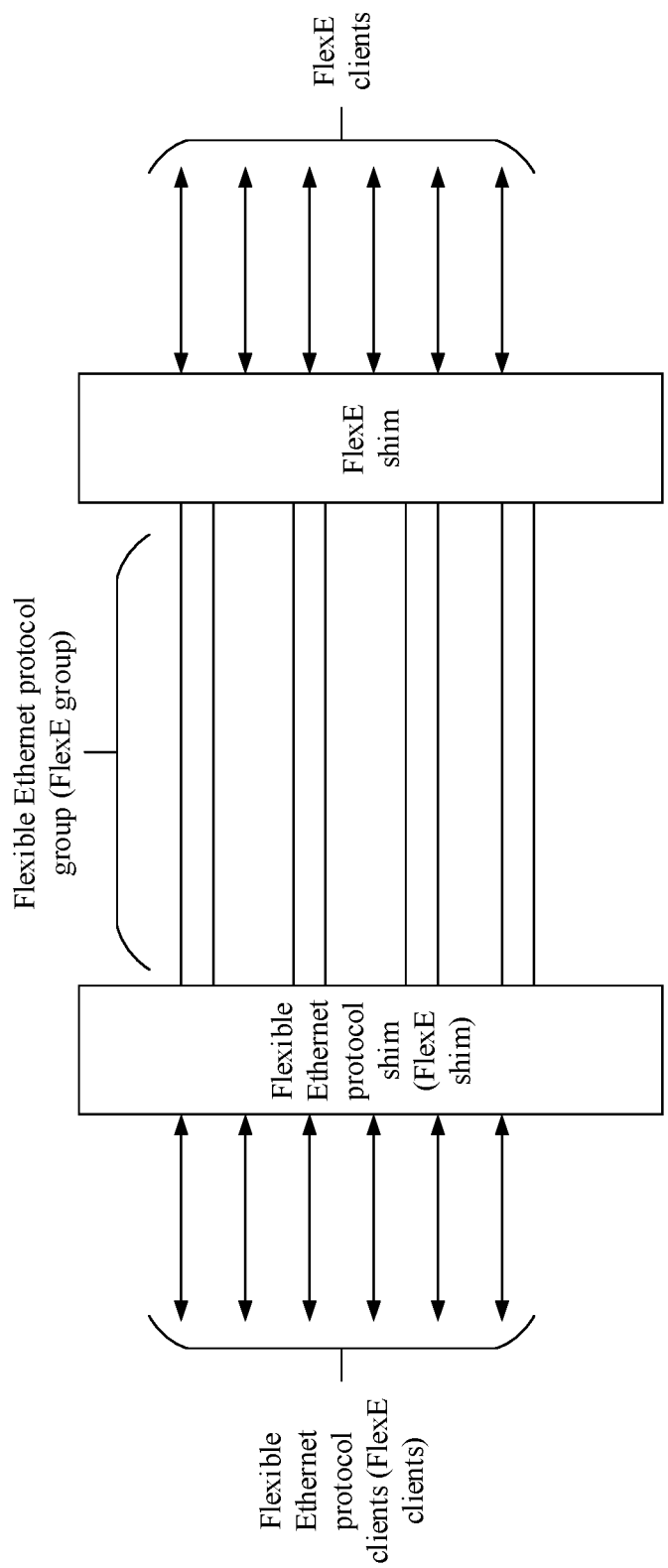
FIG. 2 is a schematic diagram of a communications system based on a Flexible Ethernet protocol according to an embodiment of this application.

It should be understood that technical solutions in embodiments of this application can be applied to various communications systems, for example, an Ethernet technology-based communications system in the mobile bearer fronthaul or backhaul field, a metropolitan multi-service bearer, data center interconnection, and industrial communication, and a communications system between different components or modules in an industrial or communications device.

For ease of understanding the solutions in the embodiments of this application, concepts and related technologies in the embodiments of this application are first described.

A best-effort (best effort) transmission service is a service model that ensures performance as much as possible. The service model is a unitary service model and also a simplest service model. An application program can be used to send any quantity of packets at any time without obtaining prior approval or notifying a network. For the best-effort service, the network tries its best to send a packet, but does not ensure performance such as a latency and reliability.

Constant bit rate CBR service: A standard specifies a plurality of types of CBR services. The CBR service and the best-effort service differ greatly. A rate of the CBR service is constant and may have specific upper and lower tolerances. For example, synchronous digital hierarchy (SDH) (synchronous transport modules (STM)-1/4/16/64) and common public radio interface (CPRI) options (Option) 1-10 are typical CBR services.

An M bit/N bit code block may also be referred to as an M/N bit block (Bit Block), and includes N bits, where M bits are payload bits. An M/N bit block is transmitted at a physical layer of an Ethernet. For example, a 1G Ethernet uses 8B/10B encoding, and an 8B/10B bit block is transmitted at a physical layer; a 10G/40G/100G Ethernet uses 64B/66B encoding, and a 64B/66B bit block is transmitted at a physical layer. With development of Ethernet technologies in the future, other encoding technologies may emerge. For example, possible encoding technologies such as 128B/130B encoding and 256B/257B encoding may emerge. For ease of description, these types of bit blocks are collectively referred to as M bit/N bit code blocks.

A 64 bit/66 bit code block may also be referred to as a 64B/66B bit block, and is a bit block transmitted at the physical layer of the 10G/40G/100G Ethernet, including a total of 66 bits: 64 payload bits and two synchronization header bits. For example, FIG. 1 shows a schematic diagram of a code type of 64B/66B encoding. Two bits "10" or "01" of a header are synchronization header bits in the 64B/66B bit block, and the latter 64 bits are used to carry payload data or a payload protocol. Each row represents a definition of a code type of a bit block. D0-D7 represent data bytes, C0-C7 represent control bytes, SO represents a start byte, and T0-T7 represent end bytes. The first row represents a data block and belongs to a data code type, where synchronization header bits are "01", and the latter bytes are all data bytes. The second row to the twelfth row represent control blocks, where synchronization header bits are "10", and the second bit to the ninth bit are type bits. The second row represents an IDLE code block whose type bit is "0x1E"; the third row represents an S code block whose type bit is "0x78"; the fourth row represents an O code block whose type bit is "0x4B"; the fifth row to the twelfth row represent T code blocks whose type bits are shown in FIG. 1. Details are not described.

FlexE: The Optical Internetworking Forum (OIF) releases the Flexible Ethernet (FexE) standard. FlexE is a general technology that supports a plurality of Ethernet MAC layer rates. A plurality of 100GE (PHYs) ports are bound, and each 100 GE port is divided into 20 timeslots in time domain by using 5 G as a granularity. FlexE can support the following functions. Binding: A plurality of Ethernet ports are bound to form one link group, to support a medium access control (MAC) service whose rate is greater than a rate of a single Ethernet port. Subrate: A timeslot is allocated to a service to support a MAC service whose rate is less than bandwidth of a link group or less than bandwidth of a single Ethernet port. Channelized: A timeslot is allocated to a service to support simultaneous transmission of a plurality of MAC services in a link group, for example, support simultaneous transmission of one 150 G MAC service and two 25 G MAC services in a 2x100 GE link group. In FlexE, a time division multiplexing (TDM) manner is used to perform division to obtain a timeslot, to implement hard isolation of transmission channel bandwidth; and one service data stream can be allocated to one or more timeslots, to implement matching on services of various rates. One FlexE group (which may also be referred to as a FlexE Group in English) may include one or more physical link interfaces (which may be denoted as a PHY in English). For example, FIG. 2 shows a schematic diagram of a communications system based on a Flexible Ethernet protocol. As shown in FIG. 2, that the FlexE Group includes four PHYs is used as an example. A Flexible Ethernet protocol client (FlexE Client) represents a customer data stream transmitted in a designated timeslot (one or more timeslots) in the FlexE Group. One FlexE Group can carry a plurality of FlexE Clients, and one FlexE Client is corresponding to one user service data stream (which may typically be referred to as a medium access control (Medium Access Control, MAC) Client). A Flexible Ethernet protocol function layer (which may be referred to as a FlexE Shim in English) provides data adaptation and transformation from the FlexE Client to the MAC Client.

Figure 3:
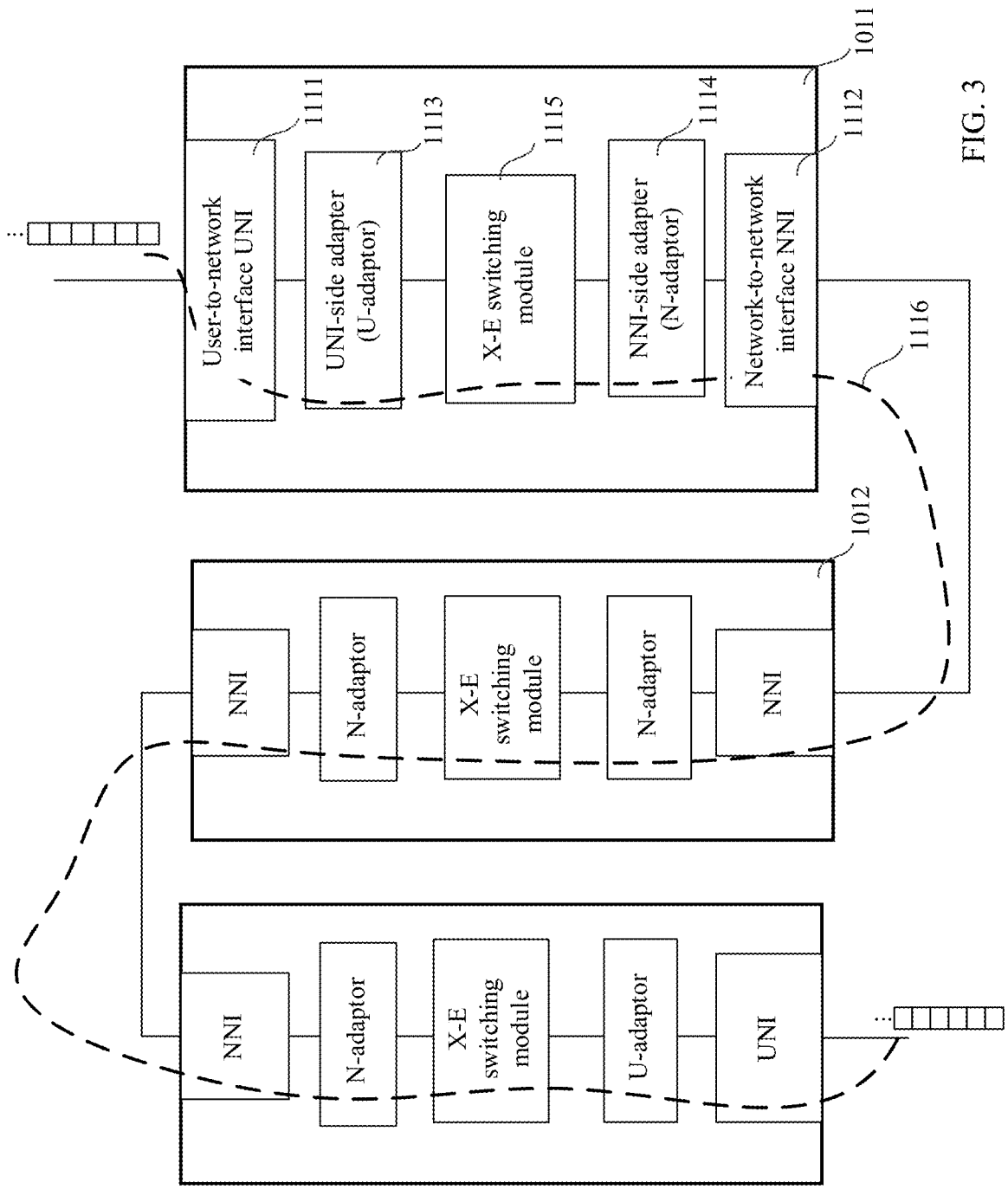
FIG. 3 is a schematic architectural diagram of an X-E communications system according to an embodiment of this application.

X-E may also be referred to as an X-Ethernet. Huawei Technologies Co., Ltd. released a novel technology at the ITU-T IMT-2020 workshop in December, 2016. The technology system may be referred to as an X-Ethernet or X-E technology system for short, and is a next-generation switching networking technology that is based on an Ethernet physical layer and that is characterized by a deterministic ultra-low latency. One line of thought of X-E is using switching networking that is based on a bit block sequence, for example, a 64B/66B bit block sequence, an equivalent 8B/10B bit block sequence, or a 9-bit block sequence, containing a 1-bit out-of-band control indication and an 8-bit character, on an interface xMII (such as GMII, XGMII, or 25GMII) unrelated to an Ethernet medium. For example, FIG. 3 shows a schematic architectural diagram of an X-E communications system. As shown in FIG. 3, the communications system may include two types of communications device, such as a first communications device 1011 and a second communications device 1012 in FIG. 3. The first communications device 1011 may alternatively be described as a provider network (referred to as a network for short below) edge communications device, may be referred to as a Provider Edge node in English, and may be referred to as a PE device for short. The second communications device 1012 may alternatively be described as a provider network (referred to as a network for short below) communications device, may be referred to as a Provider node in English, and may be referred to as a P device for short.

An XE system is used as an example for description in the following embodiments. An ingress device is an ingress PE device, and is configured to: receive a CBR service bitstream, and convert the service bitstream into a code block stream for transmission in the XE system. An egress device is an egress PE device, and is configured to: receive the code block stream, and convert the code block stream into the CBR service bitstream. It should be understood that the technical solutions in the embodiments of this application can also be applied to other bearer systems, such as an optical transport network (OTN), a Flexible optical transport network (Flexible OTN, FlexOTN), an Ethernet, a Flexible Ethernet (FlexE), a common public radio interface (Common Public Radio Interface, CPRI) network, a synchronous digital hierarchy (Synchronous Digital Hierarchy, SDH) network, an FC network, and an InfiniBand network. This is not limited in the embodiments of this application.

In the embodiments of this application, the ingress PE device receives a CBR service bitstream, and converts the service bitstream into a code block stream for transmission in the XE system. The egress PE device receives the code block stream, and converts the code block stream into the CBR service bitstream. In the embodiments of this application, two types of M bit/N bit code blocks are defined: a first-type code block and a second-type code block. The first-type code block includes M service bits, the second-type code block includes L service bits, and L is an integer less than M and not less than 0. All payload bits in the first-type code block are service bits, and only some bits of payload bits in the second-type code block are service bits. A quantity of service bits in the first-type code block is invariable, and quantities of service bits in all first-type code blocks are all M. A quantity of service bits in the second-type code block is variable, and quantities of service bits in different first-type code blocks may be different.

64B/66B is used as an example for detailed description in the following embodiments. The first-type code block is the data block in FIG. 1, or may be referred to as a D code block; and the second-type code block is an extension of a control block in FIG. 1. FIG. 4 is a schematic diagram of extending a control block according to an embodiment of this application. Extended code blocks in FIG. 4 are obtained by extending control blocks, include type bits of original control blocks, and further include indicator bits of the extended code blocks. The indicator bit is used to indicate a quantity of service bits in the second-type code block. The indicator bits are the $10^{th}$ bit to the $15^{th}$ bit, and include a total of six bits. As shown in FIG. 4, a first extension is an extension of an S code block, and locations of available service bits are from the $16^{th}$ bit to the $65^{th}$ bit; the first extension is the extension of the S code block, and the locations of the available service bits are from the $16^{th}$ bit to the $65^{th}$ bit; a second extension is an extension of a T7 code block, and locations of available service bits are from the $16^{th}$ bit to the $65^{th}$ bit; a third extension is an extension of an O code block, and locations of available service bits are from the $16^{th}$ bit to the 65th bit; a fourth extension is an extension of an O code block, and locations of available service bits are from the $16^{th}$ bit to the $33^{rd}$ bit; and a fifth extension is an extension of a reserved code block, and locations of available service bits are from the $16^{th}$ bit to the $65^{th}$ bit. In FIG. 4, only an end control block whose type bit is 0xFF is extended. Type extensions may also be performed on end control blocks whose type bits are 0x87, 0x99, 0xAA, 0xB4, 0xCC, 0xD2, and 0xE1. Details are not described herein.

The indicator bit may be used to indicate the quantity of service bits in the second-type code block, and a quantity of actual service bits may be less than that of locations of available service bits. In one embodiment, the last location of the actual service bits is aligned with the last bit location of the locations of the available service bits. In another possible embodiment, the first location of the actual service bits is aligned with the first bit location of the locations of the available service bits.

In one embodiment, the second-type code block may not include the indicator bit. In this case, the quantity of the locations of the available service bits can be increased. If the second-type code block does not include the indicator bit, a receive end may obtain the quantity of service bits in the second-type code block through prior negotiation or prior configuration, or in another manner.

In one embodiment, the L service bits in the second-type code block are consecutively distributed in the second-type code block, the L service bits are located at an $I^{th}$ bit location to an $(I+L-1)^{th}$ bit location in the second-type code block, and the $I^{th}$ bit location is a preset bit location or the $(I+L-1)^{th}$ bit location is a preset bit location. The first inserted service bit is at the $I^{th}$ bit location, and the last inserted service bit is at the $(I+L-1)^{th}$ bit location.

Figure 5:
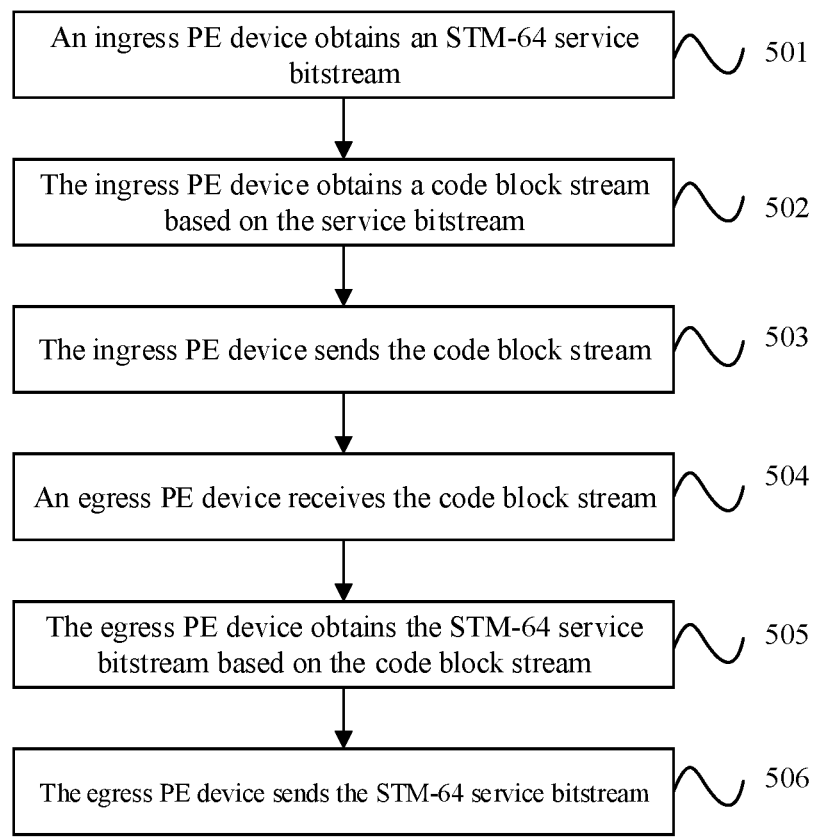
FIG. 5 is a schematic flowchart of a method for processing a service bitstream according to an embodiment of this application.

For example, FIG. 5 shows a schematic flowchart of a method for processing a service bitstream. In this embodiment of this application, an ingress PE device receives a user server, and sends the user service to an egress PE device through a server layer channel; and the egress PE device restores the user service. The user service is an STM-64, and the server layer channel is a 10 GBase-R standard Ethernet. A nominal rate of the STM-64 is Vc=9.95328 Gbps, and a nominal payload rate of the server layer channel is Vs=10

Gbps. The ingress PE device receives a CBR service bitstream, and converts the service bitstream into a code block stream for transmission in an XE system. The egress PE device receives the code block stream, and converts the code block stream into the CBR service bitstream. 10GBase-R uses 64B/66B encoding, and the nominal payload rate described in this specification refers to a value that is obtained by multiplying a nominal bit rate by 64/66.

S501: The ingress PE device obtains an STM-64 service bitstream.

S502: The ingress PE device obtains a code block stream based on the service bitstream.

In this embodiment, the code block stream is a periodic code block stream, and the service bitstream is periodically mapped to the code block stream. A mapping rule may be adjusted. A total quantity of code blocks in one code block period is invariable. Adjusting a mapping rule is mainly adjusting a quantity of service bits in a second-type code block. According to different mapping rules, quantities of service bits in second-type code blocks in different code block periods may be different. In other words, different quantities of service bits are included in different code block periods. Certainly, according to different mapping rules, a same quantity of service bits may be included in different code block periods.

In one embodiment, adjusting a mapping rule may alternatively be adjusting a total quantity of code blocks in one code block period.

Selection of a Code Block:

In this embodiment, a D code block is used as a first-type code block, and a control block obtained through the fifth extension in FIG. 4 and the IDLE code block in the second row in FIG. 1 are used as second-type code blocks. The control block obtained through the fifth extension is a control block obtained by extending a reserved code block. For the control block obtained through the fifth extension, locations of available service bits are from the $16^{th}$ bit to the $65^{th}$ bit, in other words, a total of 50 service bit locations. To be specific, a quantity of actual service bits in the control block obtained through the fifth extension is L, where 0<L<50; and the last location of the actual service bits is aligned with the last bit location, namely, the $65^{th}$ bit location, of the locations of the available service bits. The last inserted service bit is located at the $65^{th}$ bit location.

Determining of a Default Mapping Rule:

In this embodiment, an interface nominal rate for receiving the service bitstream, namely, a nominal rate of the STM-64, is Vc=9.95328; and for ease of calculation, an interface nominal payload rate for sending the code block stream, namely, a nominal payload rate of the server layer channel Vs=10 Gbps is used as an interface nominal rate for sending the code block stream. In one code block period, a total quantity of code blocks is X1=1000; a total quantity of service bits that need to be sent is X2=ceil(Vc×1000×64/Vs)=ceil(63700.992)=63701; a quantity of D code blocks is X3=floor(V×1000/Vs)=floor(995.328)=995; and a quantity of service bits carried in the second-type code block is X4=ceil(64×mod(Vc×1000/Vs))=21, where X4=X2-64×X3.

For example, 1000 code blocks are included in one code block period: 995 D code blocks, one control block obtained through the fifth extension, and four IDLE code blocks, where the control block obtained through the fifth extension includes 21 service bits.

In this embodiment, the default mapping rule is determined based on the interface nominal rate for receiving the service bitstream and the interface nominal rate for sending the code block stream. To be specific, quantities of first-type code blocks, second-type code blocks, and service bits in the second-type code block that are included in one code block period are determined. In one embodiment, upper and lower frequency tolerances may alternatively be used. To be specific, the default mapping rule is determined based on an interface nominal margin rate for receiving the service bitstream and an interface nominal margin rate for sending the code block stream.

Adjustment of the Mapping Rule:

The foregoing default mapping rule is obtained through calculation based on the nominal rate Vc of the STM-64 and the nominal payload rate Vs of the server layer channel. Because rounding operations have been performed, errors caused by the rounding are accumulated after a specific quantity of code block periods. In this case, the mapping rule needs to be adjusted. In addition, an actual rate of the STM-64 may be different from the nominal rate of the STM-64, and the actual rate may fluctuate around the nominal rate. In other words, there are upper and lower rate tolerances for the actual rate. An actual payload rate of the server layer channel may also be different from the nominal payload rate of the server layer channel, and the actual payload rate may fluctuate around the nominal payload rate. In other words, there are upper and lower rate tolerances for the actual payload rate. The mapping rule needs to be adjusted in a running process in consideration of the actual rate.

In this embodiment, a rate for obtaining the service bitstream and a rate for sending the code block stream are detected periodically, and the mapping rule is adjusted based on the detected actual rates.

1000 code blocks are included in one code block period. Based on the nominal payload rate Vs of the server layer channel, a time interval of one code block period is T=(1000×64/Vs) seconds.

In this embodiment, the mapping rule is adjusted per code block period, in other words, adjusted at a time interval of sending 1000 code blocks, where the time interval is T=(1000×64/Vs) seconds.

In this embodiment, a quantity of sent code blocks is counted, and a quantity of bits of the received CBR service is counted. Each time a count value of code blocks reaches 200, a count value of bits is obtained. When 1000 code blocks are sent, a quantity of corresponding received service bits may further be obtained in an accumulative manner. For example, if it is determined that 63702 service bits are received when 1000 code blocks are sent, the mapping rule may be adjusted. An adjusted mapping rule is: 1000 code blocks are included in one code block period: 995 D code blocks, one control block obtained through the fifth extension, and four IDLE code blocks, where the control block obtained through the fifth extension includes 22 service bits.

In this embodiment of this application, in one embodiment, the mapping rule is adjusted based on the count value of the sent code blocks and the count value of the bits of the received CBR service.

S503: The ingress PE device sends the code block stream.

S504: The egress PE device receives the code block stream.

S505: The egress PE device obtains the STM-64 service bitstream based on the code block stream.

For example, the egress device determines a type of a code block. If the code block is the first-type code block, namely, a D code block (a synchronization header is "01" in binary), all of 64 service bits are obtained from the D code block. If the code block is the second-type code block, namely, the control block obtained through the fifth extension, starting from the $65^{th}$ bit location, L service bits are obtained based on a value L of an indicator bit. If the code block is an IDLE code block, no service bit is carried.

The obtained service bits are stored in a buffer. For example, the buffer may be an FIFO. A sending rate of the service bitstream may be determined based on a threshold of the buffer. In this way, a user frequency is restored. A clock circuit may restore the user frequency of the STM-64 based on the service bitstream in the FIFO. Such a manner has at least the following advantage: A depth of the FIFO is controlled based on a bit granularity, with high restoration precision, a high restoration speed, and high restoration efficiency.

S506: The egress PE device sends the STM-64 service bitstream.

The STM-64 service bitstream is sent at the sending rate of the service bitstream.

In this embodiment, the ingress PE device only needs to receive the service bitstream from a user interface, and does not need to identify a specific frame structure or packet structure of the service bitstream. To be specific, the ingress PE device does not need to perform user service frame or packet processing by using an additional deframer or physical layer chip, and may directly map the service bitstream to the code block stream. In other words, in this embodiment of this application, the ingress PE device maps the service bitstream to the bit block stream, and does not need to consider the frame structure or packet structure of the CBR service. The egress PE device restores the service bitstream from the code block stream, and does not need to consider the frame structure or packet structure of the CBR service either.

In this embodiment, the ingress PE device adjusts the mapping rule based on the detected actual rates, to implement bit-level mapping rule adjustment. The egress PE device restores the 64 service bits from the D code block, restores the L service bits from the control block obtained through the fifth extension, and restores no service bit from the IDLE code block. The egress PE device may restore the rate of the CBR service bitstream by using the buffer, and further send the corresponding CBR service bitstream.

Figure 6:
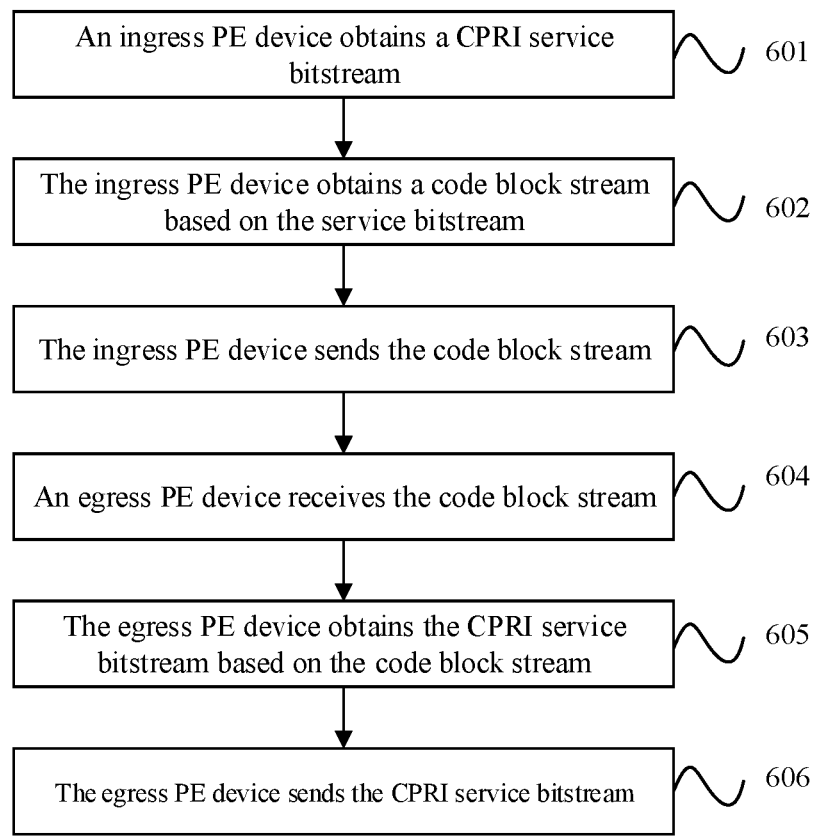
FIG. 6 is a schematic flowchart of another method for processing a service bitstream according to an embodiment of this application.

For example, FIG. 6 shows a schematic flowchart of a method for processing a service bitstream. In this embodiment, a user service is a CPRI Option7, a server layer channel is two 5 G timeslots of FlexE, a nominal rate of the CPRI Option7 is Vc=9.8304 Gbps, and a nominal payload rate of the server layer channel is Vs=10 Gbps.

S601: An ingress PE device obtains a CPRI service bitstream.

S602: The ingress PE device obtains a code block stream based on the service bitstream.

In this embodiment, the code block stream is a periodic code block stream, and the service bitstream is periodically mapped to the code block stream. A mapping rule may be adjusted. A total quantity of code blocks in one code block period is invariable. A quantity of first-type code blocks is invariable, and a quantity of second-type code blocks is also invariable. A quantity of service bits in the second-type code block may be adjusted. According to different mapping rules, quantities of service bits in second-type code blocks in different code block periods may be different. In other words, different quantities of service bits are included in different code block periods. Certainly, according to different mapping rules, a same quantity of service bits may be included in different code block periods.

Selection of a Code Block:

In this embodiment, a D code block is used as a first-type code block, and a control block obtained through the first extension and a control block obtained through the second extension in FIG. 4 and an IDLE code block are used as second-type code blocks. The control block obtained through the first extension is a control block obtained by extending an S code block. For the control block obtained through the first extension, locations of available service bits are the $16^{th}$ bit location to the $65^{th}$ bit location, that is, a total of 50 service bit locations. In other words, a quantity of actual service bits in the control block obtained through the first extension is L, where 0<L<50; and the last location of the actual service bits is aligned with the last bit location, namely, the $65^{th}$ bit location, of the locations of the available service bits. The last inserted service bit is located at the $65^{th}$ bit location. The control block obtained through the second extension is a control block obtained by extending a T7 code block. For the control block obtained through the second extension, locations of available service bits are the $16^{th}$ bit location to the $65^{th}$ bit location, that is, a total of 50 service bit locations. To be specific, a quantity of actual service bits in the control block obtained through the second extension is L, where 0<L<50; and the first location of the actual service bits is aligned with the first bit location, namely, the $16^{th}$ bit location, of the locations of the available service bits. The last inserted service bit is located at the $16^{th}$ bit location. The IDLE code block may be the code block in the second row in FIG. 1.

Determining of a Default Mapping Rule:

In this embodiment, in one code block period, a total quantity of code blocks is X1=100; a total quantity of service bits is X2=ceil(Vc×100×64/Vs)=ceil(6291.456)=6292; a quantity of D code blocks is X3=floor(Vc×100/Vs)=floor (98.304)=98; and a quantity of service bits carried in the second-type code block is X4=ceil(64×mod (Vc×100/Vs))=ceil(19.456)=20, where X4=X2-64×X3.

For example, 100 code blocks are included in one code block period: 98 D code blocks, one control block obtained through the first extension, and one control block obtained through the second extension, where the control block obtained through the first extension includes 10 service bits, and the last location of the 10 service bits is aligned with the $65^{th}$ bit location; and the control block obtained through the second extension includes 10 service bits, and the first location of the 10 service bits is aligned with the $16^{th}$ bit location.

Adjustment of the Mapping Rule:

The foregoing default mapping rule is obtained through calculation based on the nominal rate Vc of the CPRI and the nominal payload rate Vs of the server layer channel. Because rounding operations have been performed, errors caused by the rounding are accumulated after a specific quantity of code block periods. In this case, the mapping rule needs to be adjusted. In addition, an actual rate of the CPRI may be different from the nominal rate of the CPRI, and the actual rate may fluctuate around the nominal rate. In other words, there are upper and lower rate tolerances for the actual rate. An actual payload rate of the server layer channel may also be different from the nominal payload rate of the server layer channel, and the actual payload rate may fluctuate around the nominal payload rate. In other words, there are upper and lower rate tolerances for the actual payload rate. The mapping rule needs to be adjusted in a running process in consideration of the actual rate.

In this embodiment, a rate for obtaining the service bitstream and a rate for sending the code block stream are detected periodically, and the mapping rule is adjusted based on the detected actual rates.

100 code blocks are included in one code block period. Based on the nominal payload rate Vs of the server layer channel, a time interval of one code block period is T=(100× 64/Vs) seconds.

In this embodiment, the mapping rule is adjusted per code block period, in other words, adjusted at a time interval of sending 100 code blocks, where the time interval is T=(100× 64/Vs) seconds.

In this embodiment, a quantity of sent code blocks is counted, and a quantity of bits of the received CBR service is counted. Each time a count value of code blocks reaches 100, a count value of bits is obtained. When 100 code blocks are sent, a quantity of corresponding received service bits may further be obtained in an accumulative manner. For example, if it is determined that 6291 service bits are received when 100 code blocks are sent, the mapping rule may be adjusted. An adjusted mapping rule is: 100 code blocks are included in one code block period: 98 D code blocks, one control block obtained through the first extension, and one control block obtained through the second extension, where the control block obtained through the first extension includes 10 service bits, and the last location of the 10 service bits is aligned with the $65^{th}$ bit location; and the control block obtained through the second extension includes 9 service bits, and the first location of the 9 service bits is aligned with the $16^{th}$ bit location.

S603: The ingress PE device sends the code block stream.

S604: An egress PE device receives the code block stream.

S605: The egress PE device obtains the CPRI service bitstream based on the code block stream.

For example, the egress device determines a type of a code block. If the code block is the first-type code block, namely, a D code block (a synchronization header is "01" in binary), all of 64 service bits are obtained from the D code block. If the code block is the second-type code block, in other words, if the code block is the control block obtained through the first extension, starting from the $65^{th}$ bit location, L service bits are obtained based on a value L of an indicator bit; or if the code block is the control block obtained through the second extension, starting from the $16^{th}$ bit location, L service bits are obtained based on a value L of an indicator bit. If the code block is an IDLE code block, no service bit is carried.

The obtained service bits are stored in a buffer. For example, the buffer may be an FIFO. A sending rate of the service bitstream may be determined based on a threshold of the buffer. In this way, a user frequency is restored. A clock circuit may restore the user frequency of an STM-64 based on the service bitstream in the FIFO. Such a manner has at least the following advantage: A depth of the FIFO is controlled based on a bit granularity, with high restoration precision, a high restoration speed, and high restoration efficiency.

S606: The egress PE device sends the CPRI service bitstream.

The CPRI service bitstream is sent at the sending rate of the service bitstream.

In this embodiment, a structure of one code block period is S code block+D code block+T code block+IDLE code block, and a P node in a network may add or delete an IDLE code block between a T code block and an S code block based on a deviation between a receiving rate and a sending rate. This complies with requirements of the IEEE 802.3 technical specification.

In step 502 in FIG. 5 and step 602 in FIG. 6, the mapping rule is adjusted based on the rate for obtaining the service bitstream and the rate for sending the code block stream. In one embodiment, the adjustment may be simplified. The ingress PE device determines a default mapping rule; and once the default mapping rule is determined, the ingress PE device performs mapping based on the default mapping rule. The mapping rule is adjusted to form a new default mapping rule, only when an important parameter such as a nominal rate of a user side, a nominal rate of the server layer channel, or a code block period changes. In other words, the mapping rule is not frequently adjusted based on an implementation rate. The foregoing error accumulation problem caused by rounding may be handled in a procedure such as rate deviation adjustment in a server layer channel transmission process.

Figure 7:
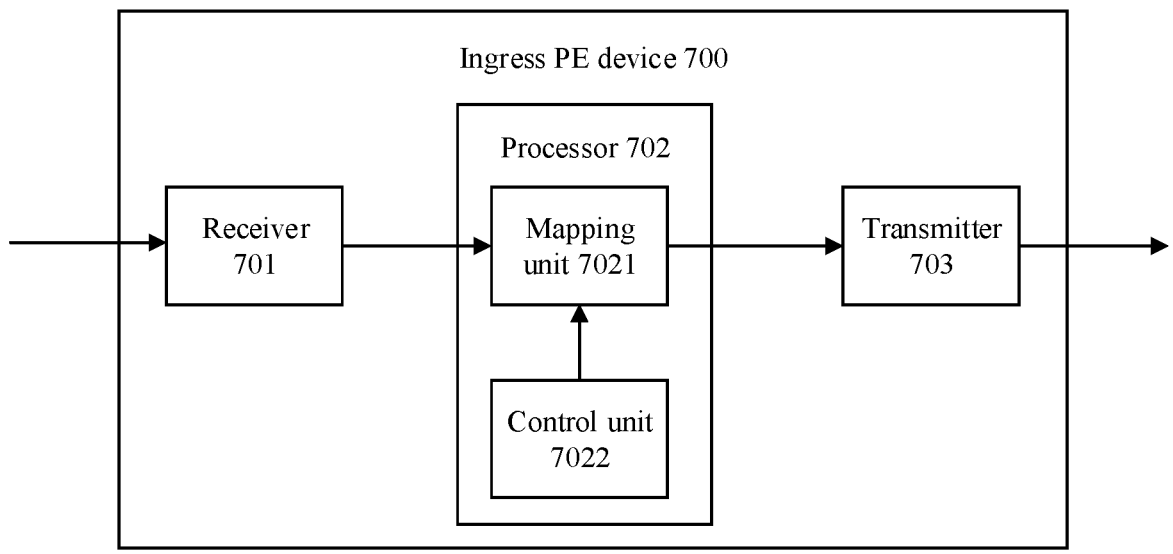
FIG. 7 is a block diagram of a structure of an ingress PE device according to an embodiment of this application.

FIG. 7 is a block diagram of a structure of an ingress PE device according to an embodiment of this application. The ingress PE device 700 in FIG. 7 includes a receiver 701, a processor 702, and a transmitter 703. The processor 702 includes a mapping unit 7021 and a control unit 7022.

The receiver 701 is configured to receive the CBR service bitstream.

The processor 702 is configured to obtain a code block stream based on the service bitstream, where an encoding type of the code block stream is M bit/N bit encoding, M is a positive integer, N is an integer not less than M, the code block stream includes a first-type code block and a second-type code block, the first-type code block includes M service bits, the second-type code block includes L service bits, and L is an integer less than M and not less than 0.

The transmitter 703 is configured to send the code block stream.

In one embodiment, the mapping unit 7021 completes a mapping operation of obtaining the code block stream based on the service bitstream.

In one embodiment, the second-type code block includes an indicator bit, and the indicator bit is used to indicate a quantity of service bits in the second-type code block.

In one embodiment, the L service bits are consecutively distributed in the second-type code block, the L service bits are located at an $I^{th}$ bit location to an $(I+L-1)^t$ bit location in the second-type code block, and the $I^{th}$ bit location is a preset bit location or the $(I+L-1)^{th}$ bit location is a preset bit location.

In one embodiment, the code block stream is a periodic code block stream, and the processor is further configured to: determine a quantity of service bits in the second-type code block in one code block period based on a rate for obtaining the service bitstream and a rate for sending the code block stream; or determine a quantity of service bits in the second-type code block in one code block period based on an interface nominal rate for obtaining the service bitstream and an interface nominal rate for sending the code block stream; or determine a quantity of service bits in the second-type code block in one code block period based on an interface nominal margin rate for obtaining the service bitstream and an interface nominal margin rate for sending the code block stream. In one embodiment, the control unit 7022 completes determining of the quantity of service bits in the second-type code block in one code block period.

In one embodiment, the code block stream is a periodic code block stream, and quantities of first-type code blocks included in different code block periods are the same.

In one embodiment, the M bit/N bit encoding is 64B/66B encoding; the second code block includes a type bit, and the type bit is one of 0x00, 0x78, 0x4B, 0x87, 0x99, 0xAA, 0xB4, 0xCC, 0xD2, 0xE1, and 0xFF; the second-type code block further includes an indicator bit, and the indicator bit is used to indicate a quantity of service bits in the second-type code block; and the type bit and the indicator bit are different bits.

In one embodiment, the service bitstream is a constant bit rate service bitstream, the M bit/N bit encoding is 64B/66B encoding, the first-type code block is a data D code block, and the second-type code block is one of an O code block, an S code block, a T code block, and an IDLE code block.

In one embodiment, the code block stream is a periodic code block stream, and a second-type code block in one code block period includes one T code block and one S code block that are consecutive; or a second-type code block in one code block period includes one T code block, an IDLE code block whose quantity is a positive integer, and one S code block that are consecutive.

Figure 8:
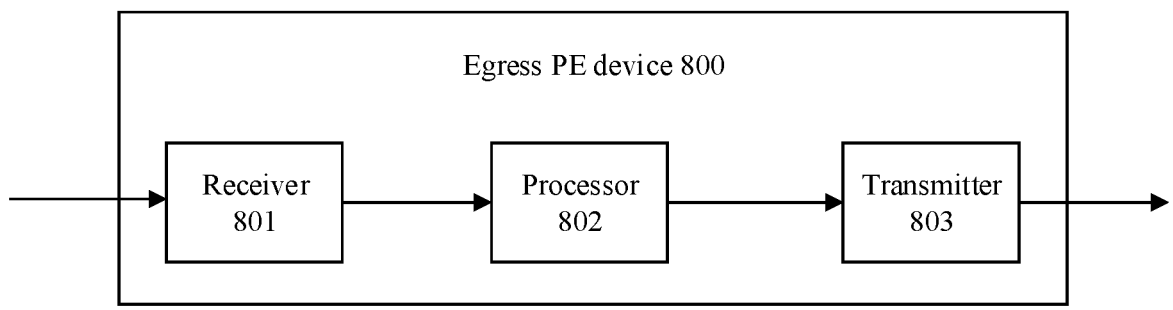
FIG. 8 is a block diagram of a structure of an egress PE device according to an embodiment of this application.

FIG. 8 is a block diagram of a structure of an egress PE device according to an embodiment of this application. The egress PE device 800 in FIG. 8 includes a receiver 801, a processor 802, and a transmitter 803.

The receiver 801 is configured to receive a code block stream, where an encoding type of the code block stream is M bit/N bit encoding, M is a positive integer, N is an integer not less than M, the code block stream includes a first-type code block and a second-type code block, the first-type code block includes M service bits, the second-type code block includes L service bits, and L is an integer less than M and not less than 0.

The processor 802 is configured to obtain the CBR service bitstream based on the code block stream.

The transmitter 803 is configured to send the CBR service bitstream.

In one embodiment, the second-type code block includes an indicator bit, and the indicator bit is used to indicate a quantity of service bits in the second-type code block.

In one embodiment, the L service bits are consecutively distributed in the second-type code block, the L service bits are located at an $I^{th}$ bit location to an $(I+L-1)^{th}$ bit location in the second-type code block, and the $I^{th}$ bit location is a preset bit location or the $(I+L-1)^{th}$ bit location is a preset bit location.

In one embodiment, the code block stream is a periodic code block stream, and quantities of first-type code blocks included in different code block periods are the same.

In one embodiment, the M bit/N bit encoding is 64B/66B encoding; the second code block includes a type bit, and the type bit is one of 0x00, 0x78, 0x4B, 0x87, 0x99, 0xAA, 0xB4, 0xCC, 0xD2, 0xE1, and 0xFF; the second-type code block further includes an indicator bit, and the indicator bit is used to indicate a quantity of service bits in the second-type code block; and the type bit and the indicator bit are different bits.

In one embodiment, the M bit/N bit encoding is 64B/66B encoding, the first-type code block is a data D code block, and the second-type code block is one of an O code block, an S code block, a T code block, and an IDLE code block.

In one embodiment, the code block stream is a periodic code block stream, and a second-type code block in one code block period includes one T code block and one S code block that are consecutive; or a second-type code block in one code block period includes one T code block, an IDLE code block whose quantity is a positive integer, and one S code block that are consecutive.

In one embodiment, the processor is further configured to: store the service bitstream in a buffer, and determine a sending rate of the service bitstream based on a threshold of the buffer.

Figure 9:
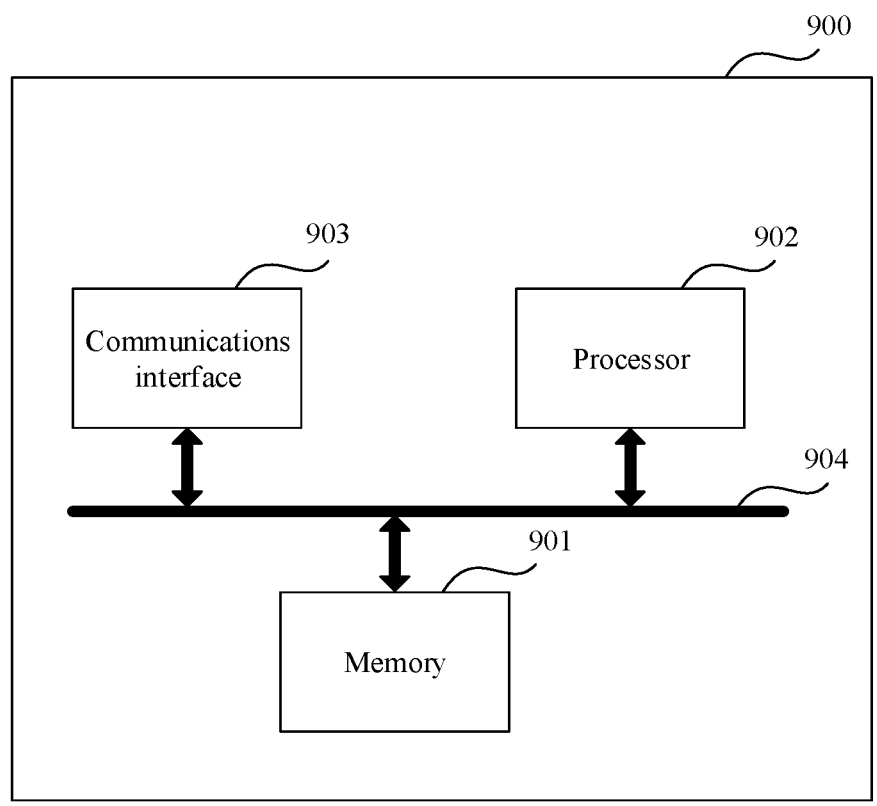
FIG. 9 is a block diagram of a structure of a service bitstream processing device according to an embodiment of this application.

FIG. 9 is a block diagram of a structure of a service bitstream processing device according to an embodiment of this application. The service bitstream processing device may be an ingress PE device, may be an egress PE device, or may be another device. As shown in FIG. 9, the service bitstream processing device 900 includes a processor 902, a communications interface 903, and a memory 901. In some embodiments, the service bitstream processing device 900 may further include a communications line 904. The communications interface 903, the processor 902, and the memory 901 may be connected to each other through the communications line 904. The communications line 904 may be a peripheral component interconnect (peripheral component interconnect, PCI for short) bus, an extended industry standard architecture (extended industry standard architecture, EISA for short) bus, or the like. The communications line 904 may be classified into an address bus, a data bus, a control bus, and the like. For ease of representation, only one thick line is used to represent the bus in FIG. 9, but this does not mean that there is only one bus or only one type of bus.

The processor 902 may be a CPU, a microprocessor, an ASIC, or one or more integrated circuits configured to control program execution in the solutions in the embodiments of this application.

The communications interface 903 may be an apparatus using a transceiver or the like, and is configured to communicate with another device or a communications network, such as an Ethernet, a radio access network (RAN), a wireless local area network (WLAN), or a wired access network.

The memory 901 may be a read-only memory (ROM), another type of static storage device that can store static information and an instruction, a random access memory (RAM), or another type of dynamic storage device that can store information and an instruction; or may be an electrically erasable programmable read-only memory (EEPROM), a compact disc read-only memory (CD-ROM), other optical disk storage, optical disc storage (including a compact disc, a laser disc, an optical disc, a digital versatile disc, a Blu-ray disc, and the like), a magnetic disk storage medium, another magnetic storage device, or any other medium that can be used to carry or store expected program code in a form of an instruction or a data structure and that can be accessed by a computer. However, this is not limited thereto. The memory may exist independently, and is connected to the processor through the communications line 904. Alternatively, the memory may be integrated with the processor.

The memory 901 is configured to store a computer executable instruction for performing the solutions in this application, and the processor 902 controls execution of the solutions. The processor 902 is configured to execute the computer executable instruction stored in the memory 901, to implement a function of the ingress PE device or a function of the egress PE device.

In some embodiments, the computer executable instruction in this embodiment of this application may also be referred to as application program code. This is not specifically limited in this embodiment of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk (Solid State Disk, SSD)), or the like.

The various illustrative logical units and circuits described in the embodiments of the present invention may implement or operate the described functions by using a general processor, a digital signal processor, an application-specific integrated circuit (ASIC), a field programmable gate array (FPGA) or another programmable logical apparatus, a discrete gate or transistor logic, a discrete hardware component, or a design of any combination thereof. The general processor may be a microprocessor. Optionally, the general processor may also be any conventional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor so that the processor may read information from the storage medium and write information to the storage medium. Alternatively, the storage medium may further be integrated into a processor. The processor and the storage medium may be arranged in an ASIC, and the ASIC may be arranged in terminal. Alternatively, the processor and the storage medium may also be arranged in different components of the terminal.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to example features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for processing a constant bit rate (CBR) service bitstream, comprising:
   receiving the CBR service bitstream;
   obtaining a code block stream based on the service bitstream,
   wherein an encoding type of the code block stream is M bit/N bit encoding, M is a positive integer, N is an integer not less than M, and the code block stream comprises a first-type code block and a second-type code block,
   wherein the first-type code block comprises M service bits from the service bitstream, the second-type code block comprises L service bits from the service bitstream, and L is an integer less than M and not less than 0; and
   sending the code block stream,
   wherein the second-type code block is one of an O code block, and an S code block.

2. The method according to claim 1, wherein the L service bits are consecutively distributed in the second-type code block, the L service bits are located at an $I^{th}$ bit location to an $(I+L-1)^{th}$ bit location in the second-type code block, and the $I^{th}$ bit location is a preset bit location or the $(I+L-1)^{th}$ bit location is a preset bit location.

3. The method according to claim 1, wherein the code block stream is a periodic code block stream, and before obtaining the code block stream based on the service bitstream, the method further comprises:
   determining a quantity of service bits in a second-type code block in one code block period based on a rate for obtaining the service bitstream and a rate for sending the code block stream;
   determining a quantity of service bits in a second-type code block in one code block period based on an interface nominal rate for obtaining the service bitstream and an interface nominal rate for sending the code block stream; or
   determining a quantity of service bits in a second-type code block in one code block period based on an interface nominal margin rate for obtaining the service bitstream and an interface nominal margin rate for sending the code block stream.

4. The method according to claim 1, wherein the code block stream is a periodic code block stream, and quantities of first-type code blocks comprised in different code block periods are the same.

5. The method according to claim 1, wherein the M bit/N bit encoding is 64B/66B encoding; the second code block comprises a type bit, and the type bit is one of 0x00, 0x78, 0x4B, 0x87, 0x99, 0xAA, 0xB4, 0xCC, 0xD2, 0xE1, and 0xFF; the second-type code block further comprises an indicator bit indicating a quantity of service bits in the second-type code block; and the type bit and the indicator bit are different bits.

6. The method according to claim 1, wherein the service bitstream is a constant bit rate service bitstream, the M bit/N bit encoding is 64B/66B encoding, the first-type code block is a data D code block, and the second-type code block is one of a T code block, and an IDLE code block.

7. The method according to claim 6, wherein the code block stream is a periodic code block stream, and a second-type code block in one code block period comprises one T code block and one S code block that are consecutive; or a second-type code block in one code block period comprises one T code block, an IDLE code block whose quantity is a positive integer, and one S code block that are consecutive.

8. The method according to claim 1, wherein the second-type code block comprises an indicator bit indicating a quantity of service bits in the second-type code block, and wherein the second-type code block is a control block comprising an extension.

9. A method for processing a constant bit rate (CBR) service bitstream, comprising:
receiving a code block stream, wherein an encoding type of the code block stream is M bit/N bit encoding, M is a positive integer, N is an integer not less than M, and the code block stream comprises a first-type code block and a second-type code block,
wherein the first-type code block comprises M service bits from the service bitstream, the second-type code block comprises L service bits from the service bitstream, and L is an integer less than M and not less than 0;
obtaining the CBR service bitstream based on the code block stream; and
sending the CBR service bitstream,
wherein the second-type code block is one of an O code block, and an S code block.

10. The method according to claim 9, wherein the L service bits are consecutively distributed in the second-type code block, the L service bits are located at an $I^{th}$ bit location to an $(I+L-1)^{th}$ bit location in the second-type code block, and the $I^{th}$ bit location is a preset bit location or the $(I+L-1)^{th}$ bit location is a preset bit location.

11. The method according to claim 9, wherein the code block stream is a periodic code block stream, and quantities of first-type code blocks comprised in different code block periods are the same.

12. The method according to claim 9, wherein the M bit/N bit encoding is 64B/66B encoding; the second code block comprises a type bit, and the type bit is one of 0x00, 0x78, 0x4B, 0x87, 0x99, 0xAA, 0xB4, 0xCC, 0xD2, 0xE1, and 0xFF; the second-type code block further comprises an indicator bit, and the indicator bit is used to indicate a quantity of service bits in the second-type code block; and the type bit and the indicator bit are different bits.

13. The method according to claim 9, wherein the M bit/N bit encoding is 64B/66B encoding, the first-type code block is a data D code block, and the second-type code block is one of a T code block, and an IDLE code block.

14. The method according to claim 13, wherein the code block stream is a periodic code block stream, and a second-type code block in one code block period comprises one T code block and one S code block that are consecutive; or a second-type code block in one code block period comprises one T code block, an IDLE code block whose quantity is a positive integer, and one S code block that are consecutive.

15. The method according to claim 9, wherein before sending the service bitstream, the method further comprises: storing the service bitstream in a buffer, and determining a sending rate of the service bitstream based on a threshold of the buffer.

16. The method according to claim 9, wherein the second-type code block comprises an indicator bit indicating a quantity of service bits in the second-type code block, and wherein the second-type code block is a control block comprising an extension.

17. An apparatus for processing a constant bit rate (CBR) service bitstream, comprising:
a receiver, configured to receive the CBR service bitstream;
a processor, configured to obtain a code block stream based on the service bitstream,
wherein an encoding type of the code block stream is M bit/N bit encoding, M is a positive integer, N is an integer not less than M, and the code block stream comprises a first-type code block and a second-type code block,
wherein the first-type code block comprises M service bits from the service bitstream, the second-type code block comprises L service bits from the service bitstream, and L is an integer less than M and not less than 0; and
a transmitter, configured to send the code block stream,
wherein the second-type code block is one of an O code block, and an S code block.

18. The apparatus according to claim 17, wherein the L service bits are consecutively distributed in the second-type code block, the L service bits are located at an $I^{th}$ bit location to an $(I+L-1)^{th}$ bit location in the second-type code block, and the $I^{th}$ bit location is a preset bit location or the $(I+L-1)^{th}$ bit location is a preset bit location.

19. The apparatus according to claim 17, wherein the code block stream is a periodic code block stream, and the processor is further configured to:
determine a quantity of service bits in a second-type code block in one code block period based on a rate for obtaining the service bitstream and a rate for sending the code block stream;
determine a quantity of service bits in a second-type code block in one code block period based on an interface nominal rate for obtaining the service bitstream and an interface nominal rate for sending the code block stream; or
determine a quantity of service bits in a second-type code block in one code block period based on an interface nominal margin rate for obtaining the service bitstream and an interface nominal margin rate for sending the code block stream.

20. The apparatus according to claim 17, wherein the second-type code block comprises an indicator bit indicating a quantity of service bits in the second-type code block, and wherein the second-type code block is a control block comprising an expension.

* * * * *

UNITED STATES PATENT AND TRADEMARK OFFICE
CERTIFICATE OF CORRECTION

PATENT NO. : 12,074,696 B2
APPLICATION NO. : 17/165835
DATED : August 27, 2024
INVENTOR(S) : Desheng Sun It is certified that error appears in the above-identified patent and that said Letters Patent is hereby corrected as shown below:

In the Claims

Column 18, Line 27, Claim 1, change "Mis" to --M is--;

Column 20, Line 23, Claim 17, change "Mis" to --M is--;

Column 20, Line 63, Claim 20, change "expension" to --extension--.

Signed and Sealed this
First Day of October, 2024

Katherine Kelly Vidal
*Director of the United States Patent and Trademark Office*